United States Patent [19]

Schwarz et al.

[11] Patent Number: 5,201,906
[45] Date of Patent: Apr. 13, 1993

[54] ANTI-PIGGYBACKING: SENSOR SYSTEM FOR SECURITY DOOR TO DETECT TWO INDIVIDUALS IN ONE COMPARTMENT

[75] Inventors: Milan Schwarz, 4985 Old Ranch Rd., LaVerne, Calif. 91711; Robert Mayer, Pleasanton, Calif.

[73] Assignee: Milan Schwarz, LaVerne, Calif.

[21] Appl. No.: 756,451

[22] Filed: Sep. 9, 1991

Related U.S. Application Data

[63] Continuation-in-part of Ser. No. 607,236, Oct. 31, 1990, Pat. No. 5,097,454, which is a continuation of Ser. No. 419,760, Oct. 11, 1989, Pat. No. 5,012,455.

[51] Int. Cl.$^5$ .............................................. G08B 13/16
[52] U.S. Cl. ........................................ 109/8; 367/93; 340/541; 49/42
[58] Field of Search ................... 367/93; 340/552, 541, 340/545; 49/26, 31, 42; 109/8

[56] References Cited

U.S. PATENT DOCUMENTS

| | | | |
|---|---|---|---|
| 4,060,039 | 11/1977 | Lagarrigue | 109/8 |
| 4,060,935 | 12/1977 | Miller et al. | 49/42 |
| 4,112,419 | 9/1978 | Kinoshita et al. | 340/560 |
| 4,332,016 | 5/1982 | Berntsen | 367/7 |
| 4,341,165 | 7/1982 | Calandritti et al. | 109/8 |
| 4,347,590 | 8/1982 | Heger et al. | 367/93 |
| 4,475,308 | 10/1984 | Heise et al. | 49/42 |
| 4,485,374 | 11/1984 | Meserow et al. | 340/541 |
| 4,530,183 | 7/1985 | Heise et al. | 49/42 |
| 4,586,195 | 4/1986 | DeGeorge et al. | 381/92 |
| 4,627,193 | 12/1986 | Schwarz | 49/42 |
| 4,628,496 | 12/1986 | Lee | 367/93 |
| 4,682,153 | 7/1987 | Boozer et al. | 340/507 |
| 5,012,455 | 4/1991 | Schwarz et al. | 367/93 |
| 5,097,454 | 3/1992 | Schwarz et al. | 49/42 |

Primary Examiner—Peter M. Cuomo
Assistant Examiner—D. Boucher
Attorney, Agent, or Firm—Christie, Parker & Hale

[57] ABSTRACT

A control system for a revolving door includes an ultrasonic sensor having multiple sensor heads. The door has a housing and multiple movable compartments formed by door wings. The sensors emit energy waves into the housing in bursts, then receive echoes from any objects, including people, in the compartments. The sensors are activated when the door is activated by an authorized user. A controller stores a binary "echo" or "no echo" signal in memory in response to an emitted energy wave. The system determines a maximum height of an object or person in a compartment, then measures the total amount of time that it detects something above a selected percentage of the maximum height. When this time reaches a predetermined amount, the system interprets that as "piggybacking" (two individuals in one compartment). The system also interprets signals that go above, drop below, and then rise above the selected percentage again as piggybacking.

14 Claims, 6 Drawing Sheets

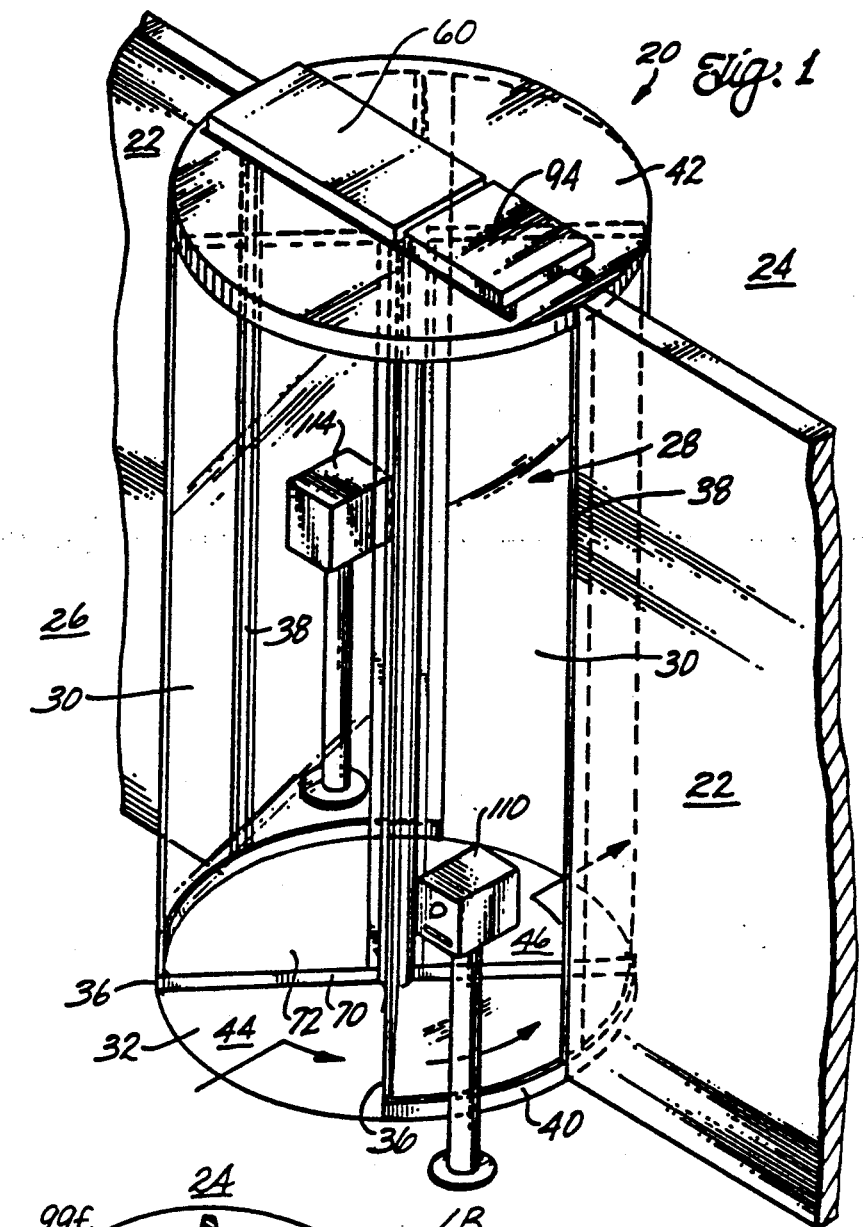
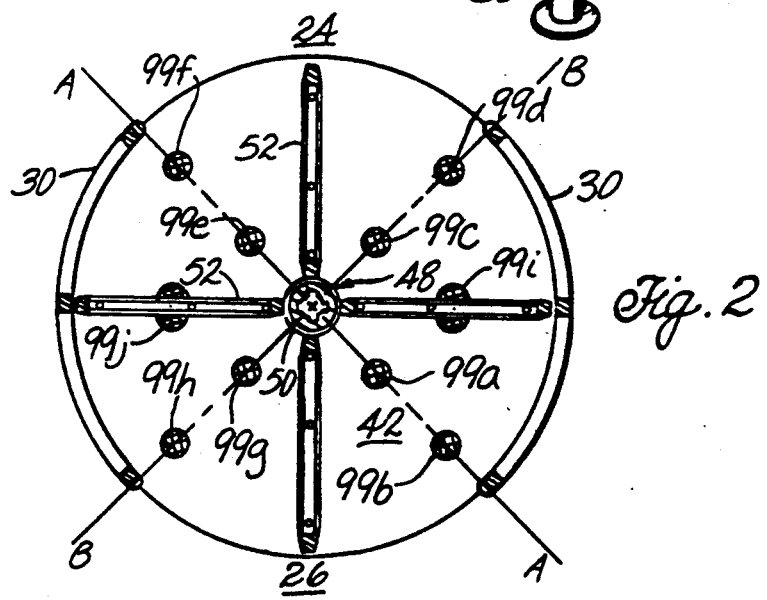

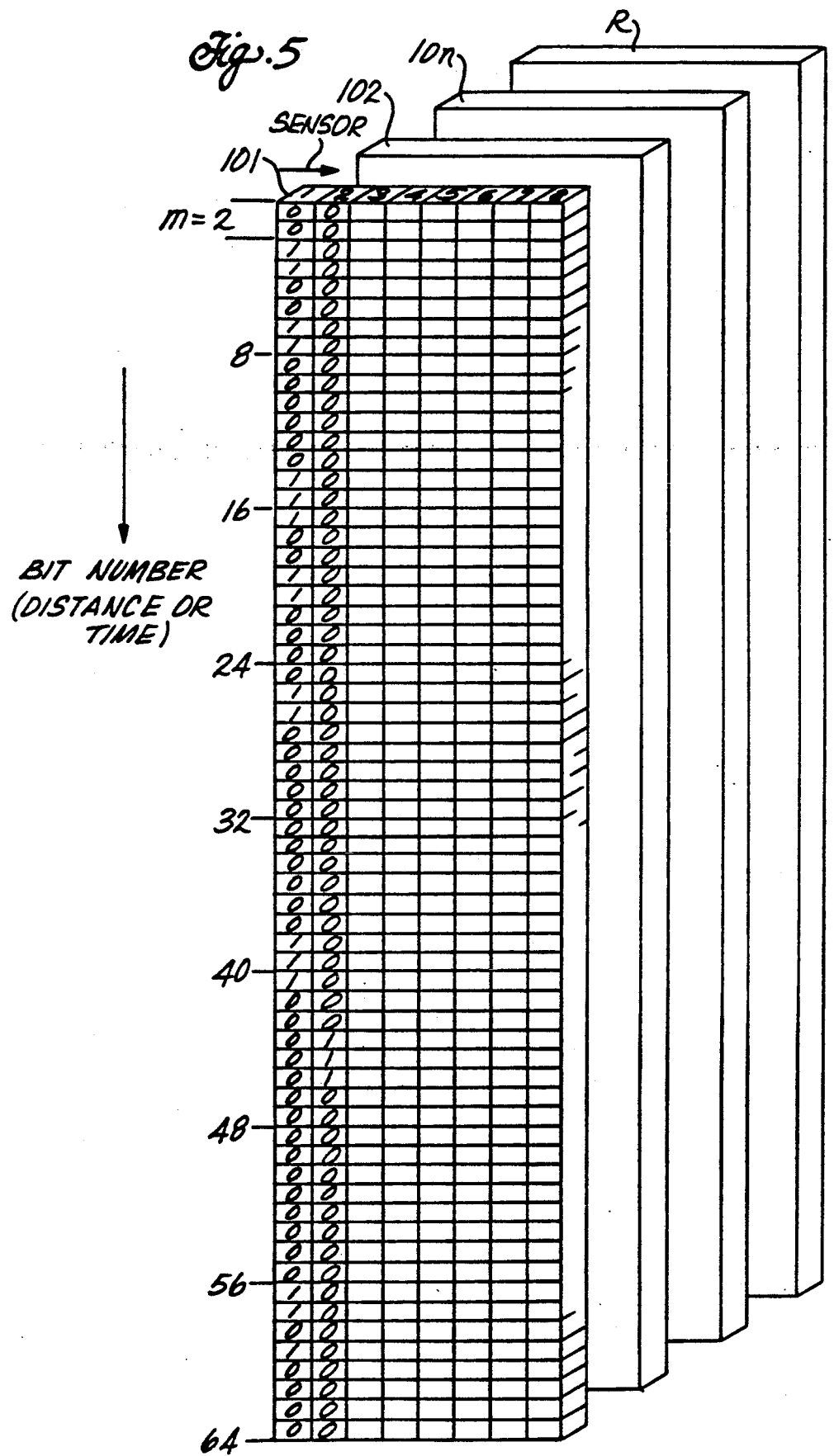

Fig. 5A

| DOOR ANGLE (TIME) → SENSOR # | $H_{MAX}$ | | | | $H_{TH}$ | | | | $t_{AT}$ | | | |
|---|---|---|---|---|---|---|---|---|---|---|---|---|
| | 1 | 2 | 5 | 6 | 1 | 2 | 5 | 6 | 1 | 2 | 5 | 6 |
| 0 | 0 | 0 | 0 | 0 | 0 | 0 | | | 0 | 0 | | |
| 3 | 0 | 0 | 0 | 0 | 0 | 0 | | | 0 | 0 | | |
| 6 | 0 | 0 | 0 | 0 | 0 | 0 | | | 0 | 0 | | |
| 9 | 0 | 30 | 0 | 0 | 0 | 30X | | | 0 | 3 | | |
| 12 | 30 | 30 | 0 | 0 | 30X | 30X | | | 3 | 6 | | |
| 15 | 30 | 72 | 0 | 0 | 30X | 72X | | | 6 | 9 | | |
| 18 | 72 | 72 | 0 | 0 | 72X | 72X | | | 9 | 12 | | |
| 21 | 72 | 64 | 0 | 0 | 72X | 72X | | | 12 | 15 | | |
| 24 | 72 | 64 | 0 | 0 | 72X | 72X | | | 15 | 18 | | |
| 27 | 64 | 64 | 0 | 0 | . | . | | | 18 | 21 | | |
| 30 | 64 | 24 | 0 | 0 | . | . | | | 21 | 24 | | |
| 33 | 64 | 24 | 0 | 0 | . | . | | | 24 | 27 | | |
| 36 | 64 | 24 | 0 | 0 | | | | | 27 | 30 | | |
| 39 | 24 | 0 | 0 | 0 | | | | | 30 | 30 | | |
| 42 | 24 | 0 | 0 | 0 | | | | | 33 | 30 | | |
| 45 | 0 | 69 | 0 | 0 | | | | | 33 | 33 | | |
| 48 | 69 | 69 | 0 | 0 | | | | | 36 | 36 | | |
| 51 | 69 | 69 | 0 | 0 | | | | | 39 | 39 | | |
| 54 | 69 | 69 | 0 | 0 | | | | | 42 | 42 | | |
| 57 | 69 | 30 | 0 | 0 | | | | | 45 | 45 | | |
| 60 | 69 | 30 | 0 | 0 | | | | | 48 | 48 | | |
| 63 | 69 | 30 | 0 | 0 | | | | | 51 | 51 | | |
| 66 | 30 | 30 | 0 | 0 | | | | | 54 | 54 | | |
| 69 | 30 | 0 | 0 | 0 | | | | | 57 | . | | |
| 72 | 30 | 0 | 0 | 0 | | | | | 60 | . | | |
| 75 | 30 | 0 | 0 | 0 | | | | | 63 | . | | |
| 78 | 30 | 0 | 0 | 0 | | | | | 66 | . | | |
| 81 | 0 | 0 | 0 | 0 | . | . | | | . | . | | |
| 84 | 0 | 0 | 0 | 0 | . | . | | | . | . | | |
| 87 | 0 | 0 | 0 | 0 | . | . | | | . | . | | |
| 90 | 0 | 0 | 0 | 0 | 72X | 72X | | | 66 | 54 | | |

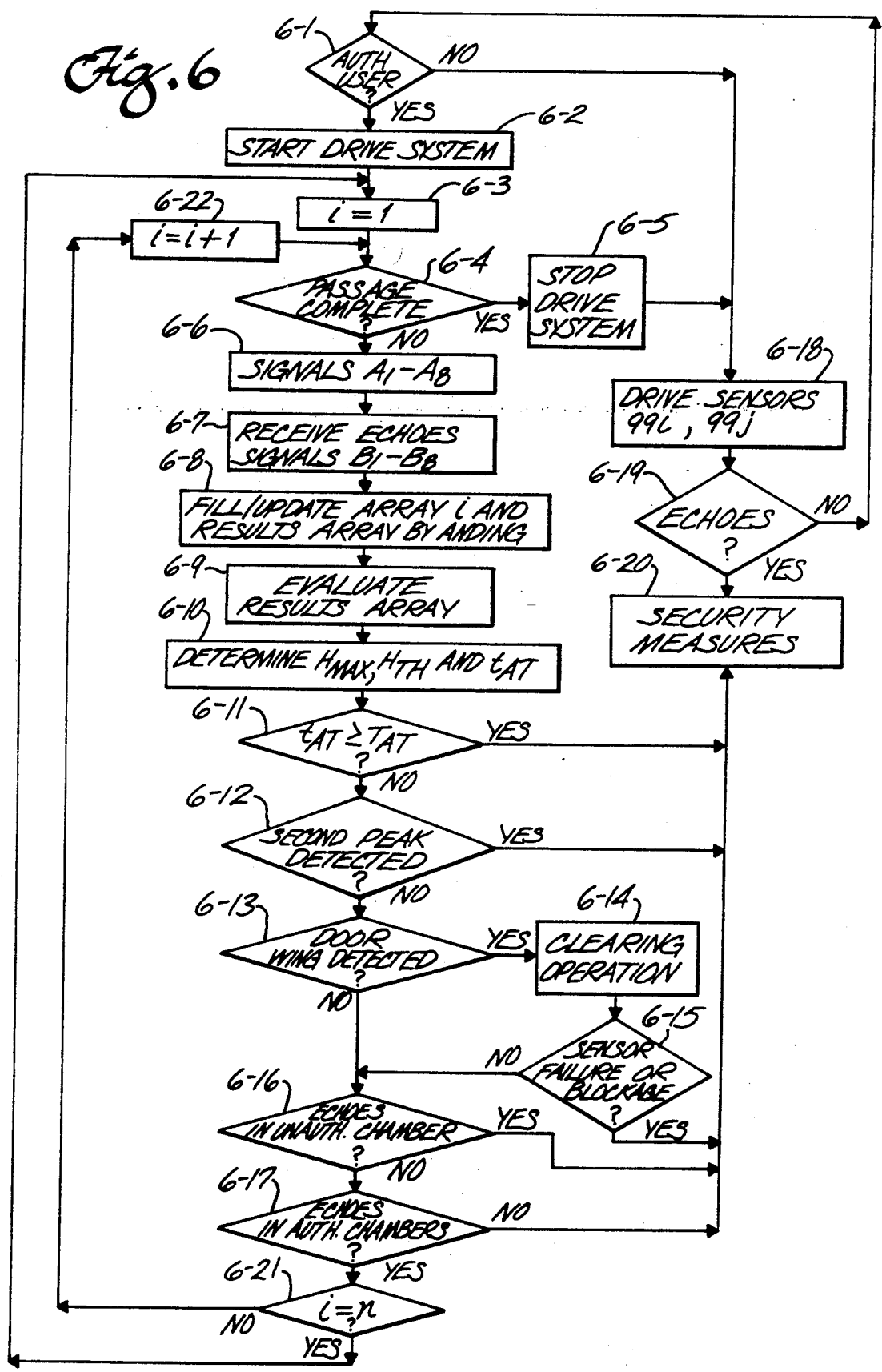

ANTI-PIGGYBACKING: SENSOR SYSTEM FOR SECURITY DOOR TO DETECT TWO INDIVIDUALS IN ONE COMPARTMENT

CROSS-REFERENCE TO RELATED APPLICATIONS

This is a continuation-in-part of application Ser. No. 07/607,236, filed Oct. 31, 1990, now U.S. Pat. No. 5,097,454, which is a continuation of application Ser. No. 07/419,760, filed Oct. 11, 1989, now U.S. Pat. No. 5,012,455, issued Apr. 30, 1991.

BACKGROUND OF THE INVENTION

This invention relates generally to security passageways, and particularly to security doors, and the sensing of unauthorized passage of objects, as well as people through the doors, especially "piggybacking."

Security doors are used in airports, banks, commercial buildings, military installations, and other locations where restricted access is desirable. One type of security door is a revolving door such as disclosed in U.S. Pat. No. 4,627,193. Normally, in this type of door, a person inserts a pass card, then enters a compartment on one side of the door. If the card is authorized, the door will turn until the entered compartment moves from the entrance to the exit. As the entered compartment revolves, all compartments move by a corresponding amount. Therefore, it is possible for an unauthorized person to "tailgate", i.e., to either enter the compartment immediately following the one containing the authorized person, or enter a compartment located at the exit. It is also possible for two people to attempt to pass in the same compartment ("piggybacking").

One way that tailgating and piggybacking have been detected is by the use of floor mats in the security door to detect when a compartment has been entered. However, such mats have several drawbacks.

It has been proposed to use ultrasonic sensors, instead of mats, but use of such sensors in a revolving door presents difficult problems. First, the sensors must distinguish between door panels and people or objects. If the sensors are merely turned off when the door panel passes by, objects attached to, or close to, the door panel can get through the doorway undetected. Second, to detect small objects, such as pass cards or firearms, the sensors must have a high gain. Such a high gain increases the likelihood that reverberations or echoes will cause false readings. This is especially true in a security revolving door which has a substantially closed housing. Similarly, the greater the range (portion of the floor to ceiling distance) covered by the sensor, the greater the likelihood of false readings due primarily to echoes from the floor. Moreover, piggybacking has been undetectable with ultrasonic sensors. Accordingly, in spite of their drawbacks, floor mats have been popular in security door devices.

SUMMARY OF THE INVENTION

The invention is an improved sensor system for a security door to prevent unauthorized entry to, or exit from, a secured area and, in particular, to prevent piggybacking. The invention is also a security door including the improved sensor system.

In one embodiment, the security door has a housing having an entrance into, and an exit from, a room. The door includes a central shaft, or the like, rotatably disposed in the housing and supporting a plurality of panels or wings which, in cooperation with the housing, define at least one compartment rotatable with the shaft to transport a person between the entrance and exit. The door has a control system which includes a main microprocessor that receives inputs from an identification mechanism, such as a card reader and a sensor system, and outputs signals to control the door. The control system includes a mechanism for rotating the shaft, thereby moving a selected compartment between the entrance and exit in response to identification of an authorized person. As the shaft rotates, the control system keeps track of the position of the authorized chamber.

The sensor system preferably includes another microprocessor, and ultrasonic or other energy sensors for detecting physical objects generates a signal as the authorized person passes through the housing. This sensing system will also detect when a person or object is in another compartment. Should the main microprocessor determine that the position of the compartment, and the generation of the signal indicate that an unauthorized person or object is in another compartment, the microprocessor will issue a disabling command to prevent further forward movement of all compartments. Should the system determine that there are two people in one compartment, the system will also issue the disabling command.

In a preferred embodiment, the ultrasonic sensors are located on the ceiling of the door housing for irradiating waves in a generally conical shape downward into the housing. The microprocessor controlling the sensors ignores signals from the door frame, yet reacts to signals from objects in those compartments for which passage has not been authorized.

In the preferred embodiment, the sensor controller samples echoes at predetermined times following a burst and stores a "1" or "0" in an array of memory in response to detection of an echo or no echo. Each array is organized by columns of bits, each column being associated with one sensor, and each bit in the column corresponding to a predetermined elapsed time from a particular ultrasonic burst. Corresponding bits in corresponding columns of each array are ANDed together to reduce the likelihood of a false echo from ghosts caused by any reverberations of echoes.

The system also determines the maximum height it detects and calculates a predetermined portion of that height as a threshold value. Should any subsequent highest point detected fall below this threshold, and then rise above it, the system interprets this as two individuals in a compartment. The system also determines the total time that it detects an object above the threshold, and will interpret this as two individuals, if the total time is beyond a predetermined amount. When the system detects two individuals in a compartment, it issues the disabling command.

The above features and advantages of the invention, as well as additional features and advantages, will be appreciated and better understood by reference to the following detailed description, when considered in conjunction with the accompanying drawings.

BRIEF DESCRIPTION OF THE DRAWINGS

FIG. 1 is a perspective view of a security door incorporating sensors and a control scheme according to the present invention;

FIG. 2 is a view of the underside of the top of the security door of FIG. 1 to illustrate placement of the sensors;

FIG. 5 is a schematic of the memory used in the control system according to the invention;

FIG. 5A is a further schematic of the memory of FIG. 5; and

FIG. 6 is a flowchart showing the inventive control scheme.

DETAILED DESCRIPTION OF THE PREFERRED EMBODIMENT

Figure 3:
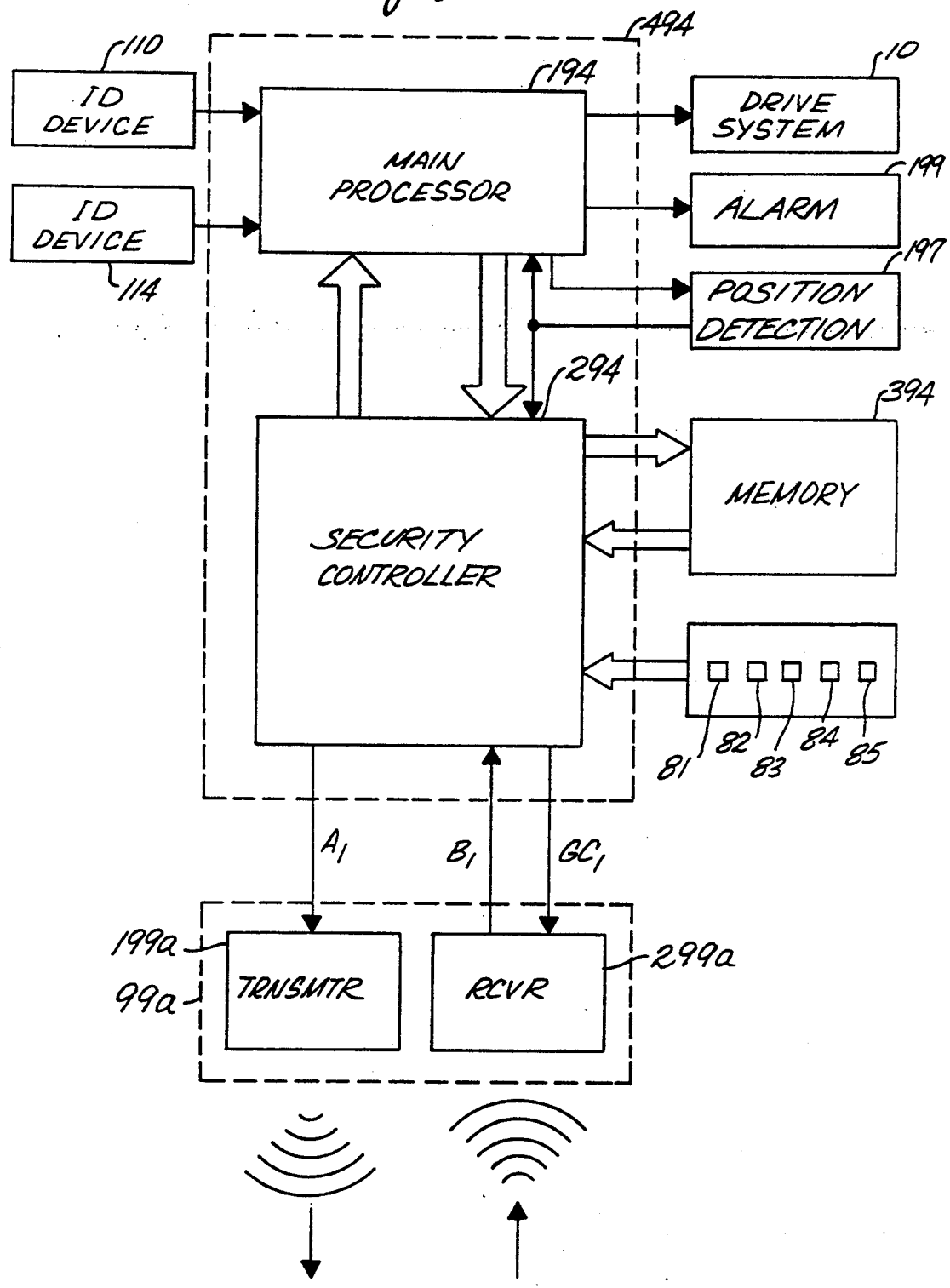
FIG. 3 is a schematic showing major components of the security door control system.

The control and sensor system for a security door according to the invention operate together to detect the presence of unauthorized persons (or objects) attempting to gain passage through the door by "piggybacking", as well as "tailgating." When piggybacking or tailgating is detected, the control system will prevent the unauthorized person or people from passing through by stopping the door. In a preferred embodiment, the door will then be reversed to forcibly move the unauthorized user(s) to the entrance or exit at which he (they) entered the door.

FIG. 1 shows a security door 20 with sensors and a control system according to the present invention. Preferably, door 20 is a revolving door. The door is incorporated into a wall 22 which separates a security area 24 from a general access, or lesser, security area 26. The wall 22 with door 20 functions as a security barrier between areas 24 and 26.

The door has a cylindrical housing 28 which includes upstanding, semi-cylindrical panels 30. The panels 30, as shown in FIGS. 1 and 2, extend between a circular bottom 32 and a top 42. The panels preferably span approximately 90° of arc. Each panel 30 is fashioned from a pair of semi-cylindrical segments (such as glass) connected between, and supported by, edge posts 36, a center post 38, and a bottom skirt 40 secured to the bottom 32. The posts 38 are connected to the wall 22 to incorporate the panels 30 into the wall structure. The semi-cylindrical segments may be fashioned from various materials, including standard or safety glass, bulletproof glass, acrylic, or solid bars, as desired.

The top 42 is typically incorporated into the ceiling (not shown) of the facility. The panels 30, top 42, and bottom 32 cooperate to define cylindrical housing 28, having two arcuate portals, an entrance 44 in general access area 26, and an exit 46 in security area 24.

To prevent unauthorized persons from passing between the entrance 44 to exit 46, door 20 includes a revolving door member 48 disposed in the housing (see FIG. 2). Revolving door member 48 has a rotatable shaft 50 supported between the top 42 and bottom 32. The top 42 has an axial opening (not shown) through which shaft 50 protrudes. Four wings 52 project outwardly from shaft 50 and are of sufficient length to sweep close to semi-cylindrical panels 30. While door 20 preferably has four identical panels or wings 52 spaced roughly 90° from one another, more or fewer panels with other spacing could be used, as desired. The four spaced panels 52 cooperate with housing 28 to define four rotatable pie-slice-shaped compartments. A person desiring to move from one of the areas 24, 26 to the other enters a selected compartment and travels therewith between entrance 44 and exit 46.

Door 20 has a drive system 60 which includes an electric motor, a motor multiplier, and a gear reducer, such as described in U.S. Pat. No. 4,627,193, hereby incorporated by reference. Drive system 60 is coupled to revolving door member 48 so that operation of the drive system rotates member 48.

The door wings 52 each include a rectangular frame 70 supporting a pane 72. The frame 70 has a length to project from the shaft 50 to sweep closely to the semi-cylindrical panels 30 as the member 48 revolves and it has a height to extend from a location near the bottom 32 to a position near the top 42.

To prevent unauthorized ingress and egress from security area 24, a control system is provided. In the disclosed embodiment, the control system is located in a box 94 on the top 42 of housing 28. While the following description is (for purposes of explanation) primarily directed toward unauthorized entry into security area 24, the description is equally applicable to the situation where unauthorized items, including personnel, attempt to exit the security area.

As shown in FIG. 3, the inventive control system includes a main processor 194, a security controller 294, and supporting peripheral hardware housed within enclosure 94 for controlling the starting, stopping, and directional rotation of the motor and shaft which turn the compartments. As a specific example of the preferred embodiment, the main processor is an Intel 8749 or 8751 microprocessor manufactured by Intel Corporation, and the controller is a Zilog Z8 microprocessor manufactured by Zilog Corporation. The peripheral hardware includes a memory 394, sufficiently large to perform calculations and control functions which will hereinafter become apparent, for example, a random-access memory (RAM). Suitable types and sizes of memory will be evident to one of ordinary skill and will depend upon the desired speed and accuracy of the detection system and the various memory management techniques adopted.

The main processor 194 includes, or is linked to, a mechanism which determines door position, e.g., by using a pulse generator as set forth in U.S. Pat. No. 4,627,193. In that patent, door position is tracked by using a cam and a cam follower, which has its motion translated by a proximity sensor into pulses which occur at each predetermined increment of door rotation, e.g., 3°. This mechanism is represented in FIG. 3 by position detection system 197. The pulses are recorded by a counter, which is read by main processor 194. The value on the counter corresponds to a specific amount of door rotation. The position indicator also preferably gives a second signal indicating each 90° of rotation. These pulses may be given directly to the security controller 294, too. When the door completes 180° of rotation, i.e., the point in the present embodiment where the entered compartment has moved to the exit compartment, another proximity detector in detection system 197 indicates such movement to main processor 194, and the processor stops drive system 60 and resets the counter. The control system also includes identification devices 110, 114, such as card readers or other devices for identifying an authorized user, to initiate the entry sequence and antijam features, as set forth in that same patent.

In the present invention, to detect people or objects, the door includes an array of sensors 99a-99h, preferably arranged in a circular pattern around the ceiling of the housing, as depicted in FIG. 2. It is preferred to mount the sensors on the ceiling, rather than the floor where they may be stepped on or subjected to rain, water, snow, dirt, or other undesirable environmental conditions.

The sensors radiate energy waves, preferably ultrasonic, in a generally conical shape and detect the echoes of the waves reflected from any physical surfaces encountered. Having multiple concentric arrays of the sensors around center post-axis 24 allows greater coverage of the area in the compartment. Preferably, each circle includes at least one sensor for each compartment, each sensor being placed at an angular displacement about the center post-axis identical to that of the angle defined by any two adjacent door panels 52. In the illustrated revolving door, adjacent panels meet at 90° so that the sensors are separated by 90°. Although this geometry is preferred, there are many other configurations and numbers of sensors which will provide suitable coverage of the housing and which fall within the spirit and scope of the invention.

In general, operation takes place as follows: Once an authorized user has been identified by the card reader 110 or 114, main processor 194 activates position detection system 197 and also activates drive system 60 to revolve the compartments. At the same time, or substantially contemporaneously, the main processor 194 instructs security controller 294 to activate sensors 99a-99h to detect non-empty compartments. The sensors emit bursts of ultrasonic waves and detect return echoes from objects, including people. FIG. 3 shows controller 294 in association with memory 394 and sensor 99a. Connection with, and operation of, the other sensors is the same.

In particular, sensor 99a receives, at preset time intervals, a digital waveform $A_1$ from the controller having a frequency in the ultrasonic range. The sensor has a transmitter 199a, which includes an amplifier for translating the electrical waveform into successive bursts of ultrasonic acoustical waves directed from the sensor head toward the floor of each compartment. Each sensor head also includes a receiver 299a having a sense amplifier for detecting return echoes of the waves. The transmitter and receiver are typically dormant when there is no attempted passage through the revolving door. That is, signal $A_1$ is not being generated or sent.

During attempted passage, the transmitter and receiver are activated by controller 294 which sends signal $A_1$, and also a signal $GC_1$, adjusting the gain of the sense amp to an amount appropriate for receiving the echoes. Preferably, the gain of the sense amp is increased over time by controlling the time period between each clock signal in signal $GC_1$. In other words, the gain clock signal selectively increments the gain of the receiver in digital steps, which may be set and implemented by using an integrated circuit in the sensor head. Each pulse on the gain clock line increments a counter in the sense amp in receiver 299a to select the next highest incremental gain step. The counter is reset to the first, i.e., lowest gain step, by a burst signal. Control of the time spacing between gain clock pulses determines the rate of increase of gain with time following the burst, thus eliminating the need for different sensor heads for different environments. A suitable gain clock signal is active low and is approximately 15 microseconds wide.

The amount of increase of gain with respect to time may be selected and set at installation, based primarily on the door structure. For example, in a door with highly polished or mirror-like surfaces, a smaller gain with time is appropriate than in a door with a textured rubber floor and bar-like door wings.

The bursts $A_1$ through $A_8$ are typically relatively short, e.g., 0.5 ms, and drive the transmitter at a frequency on the order of 48 kHz, but this frequency may vary, as explained below. Preferably, the bursts are active low.

After each burst, security controller 294 waits a predetermined period of time so that the sense amp in sensor 99a can receive the echoes of any objects the burst encounters. This "echo receive time" is at least as long as a maximum desired distance d set for the sensors to detect objects in the chambers. For example, in a typical door with a floor-to-ceiling distance of 8', d could be set to 7' (12" above the floor). The echo receive time is determined empirically, e.g., when the door is installed, or is calculated based on the speed of the ultrasonic waves. Preferably, the time between bursts is set greater than the echo receive time, so that any reverberations will die out, or substantially die out, by the next burst. In addition, interference from other chambers will be minimized.

The echoes are received by the sense amps in sensors 99a through 99h in real time, and the gain of the sense amps is controlled over this time to effectively convert the echoes into digital signals $B_1$ through $B_8$. The sense amps simply are "go"/"no go" detectors that pass a single-bit digital signal $B_1$ to an input port of the controller 294.

Figure 4A:
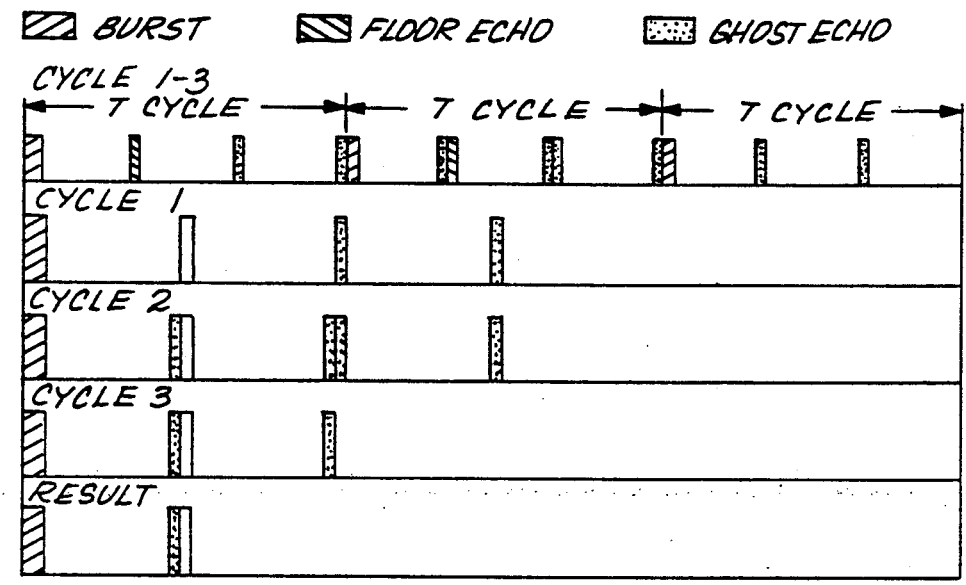
FIGS. 4A and 4B are waveform diagrams of the energy waves emitted by, and reflected toward, the sensor.
Figure 4B:
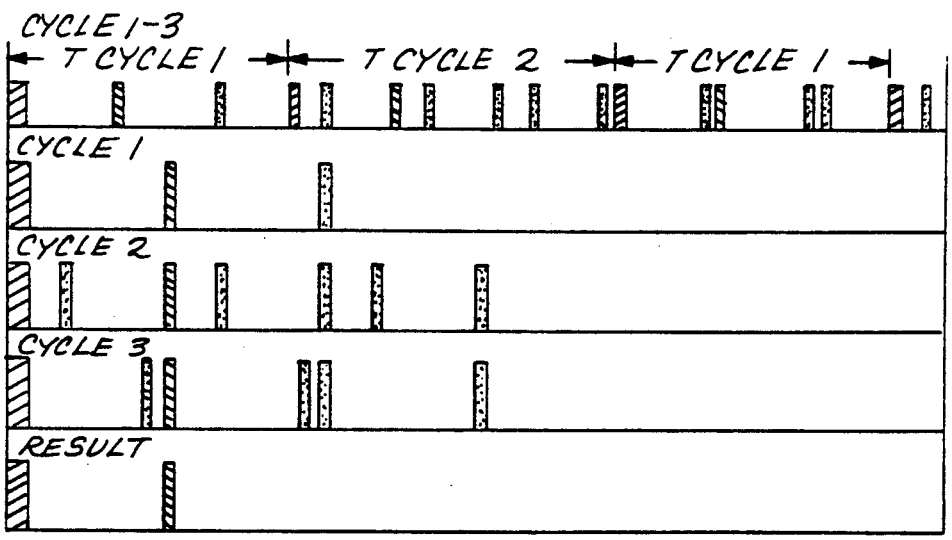

One of the problems with using sensors in a relatively closed structure, such as a revolving door, is noise from echo reverberation causing false detection of objects. The present invention solves this problem in a novel way. The problem of echo reverberation is shown in FIG. 4A. When the bursts have a constant cycle rate, "ghost" echoes of an initial echo occur due to multiple reflections, especially in a closed chamber and especially where the energy waves are sufficiently powerful to enable detection of small or soft objects. The ghosts will be received at the same elapsed time following each particular burst. To avoid reading these ghosts as true echoes, the system is modified in two ways. First, the burst cycle time is varied, as shown in FIG. 4B. This causes ghosts to be misaligned. The preferred time between bursts alternates such that T cycle 1 corresponds to 3° of door movement, T cycle 2 corresponds to 3° plus one-half of the echo receive time, T cycle 3 corresponds to 3°, and so on. Second, the detected echoes following each burst are stored (in memory 394 shown in detail in FIG. 5 as explained below) in relation to the elapsed time from the most recent burst, and the stored echoes from (at least) the last two bursts are logically ANDed to obtain a results array R. Any echoes that occur at the same time interval after both the last two bursts will result in a "1". Otherwise, the result is "0" for that time interval. As shown in FIG. 4A, where the cycle times do not vary, ghosts will occur in cycles 2 and 3 at the same elapsed time, causing an erroneous detection. However, as shown in FIG. 4B, the ghosts do not occur at the same elapsed time due to the varying burst cycle, so the ghosts are cancelled out by the ANDing process.

Figure 4C:
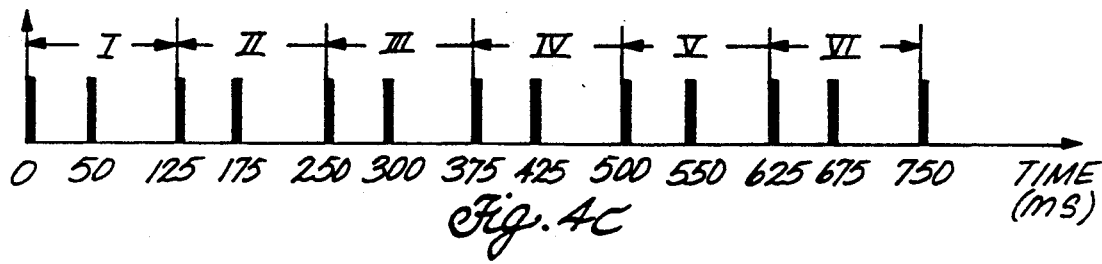
FIG. 4C is a waveform diagram of energy waves emitted by the sensor.

Another problem that can arise by using sensors in a revolving door is interference caused by echoes or reflections from bursts in one chamber reaching sensors in other chambers. Often, the door wings are formed solidly, thus preventing interference. In such a case, burst signals $A_1$ through $A_8$ are sent in any desired fashion, e.g., simultaneously, staggered, or sequentially. That is, as shown in FIG. 4C, signals $A_1$ through $A_8$ are each formed by signal portions I, II, etc. However, if the door wings are constructed non-solidly, interference is likely to occur, so it is preferable to send sequential or staggered signals $A_1$ through $A_8$. That is, $A_1$ and $A_2$ are sent to sensors 99a, 99b (e.g., in period I), then signals $A_3$ and $A_4$ are sent to sensors 99c and 99d (e.g., in period II), followed by signals $A_5$ and $A_6$ being sent to sensors 99e and 99f (e.g., in period III), then signals $A_7$ and $A_8$ are sent to 99g and 99h (e.g., in period IV). This pattern keeps repeating. Sequential emission avoids detection of echoes due to bursts of sensors in one area by sensors in another area.

Any reasonable staggered or sequential rotation of sensor operation is acceptable. The stagger or sequence time should be set, taking into account the gain of the sensor head and the dimensions of the chambers, as the smaller the chambers and the greater the gain, the more multiple reverberations will be likely to interfere with sensors in other chambers. Accordingly, the greater the delay time between the activation of sensors in one chamber and activation of sensors in another chamber, the more the reverberations die out. It should be noted that reduction of the gain too much will jeopardize the ability to detect small or soft objects, including reducing the ability to detect card passback.

With reference to FIG. 5, the storage of echoes and the ANDing process will be explained in more detail. The memory is preferably in the form of multiple storage arrays 101, et seq. Each array has eight columns, each column for storing echoes of a particular sensor. Each bit in each column corresponds to an amount of time it takes, following a burst from that particular sensor, for an echo to return to the sensor. As time corresponds directly to the distance an object is from the sensor, each bit in a column also corresponds to a particular distance of an object from the sensor. In the disclosed embodiment, there are sixty-four bits in each column. If the distance d is 7' (84"), and each bit represents a predetermined incremental distance such as 1.5", fifty-six bits represent 7'. The controller 294 keeps track (e.g., by a timer, counter, or other means) of how much time has elapsed since a burst, and places the "echo" or "no echo" signal received from the sensor in the appropriate bit for that amount of time. That is, the controller 294 will place "1" (echo) or "0" (no echo) in each bit, at least up to fifty-six in array 101 for echoes of a first burst. Following a second burst, the controller fills array 102 in the same way. The process continues until array 10n has been filled. Then, the controller fills the results array R by logically ANDing each matching pair of bit and sensor numbers from each array 101 through 10n. For example, the value stored in bit 1 for sensor 1 in array 101 will be ANDed with the values stored for bit 1 for sensor 1 in arrays 102 through 10n, and the result will be stored in bit 1 for sensor 1 in the results array R. If all the first bits are "1", the first bit in the results array will have a "1"; otherwise it will have a "0". The arrays 101, 102 . . ., are preferably filled in a circular pattern.

This logical ANDing process, together with the varying of the burst repetition rate (cycle time), removes, or at least minimizes, the affect of any ghost reflections that get stored in any of the arrays 101 through 10n. For example, if cycle times of the burst signals are constant, the ghost echoes are likely to be stored in coincident bit numbers in each array 101 through 10n, causing a "1" to be incorrectly stored in the results array R. When the cycle times are varied, ghosts are not likely to coincide, so a false "1" stored in a particular bit in one array will be eliminated during logical ANDing by a "0" in the same bit number in another array. Generally, two arrays are sufficient to eliminate ghosts, but if memory space is available, more arrays ensure greater reliability. The filling of the storage arrays 101 through 10n and the results array R are all preferably done in real time, but can be delayed, if desired.

Another problem with ultrasonic detectors is that a door panel passing beneath the sensor returns an echo as would an object or a person in the compartment. Accordingly, it is necessary to provide security controller 294 with a mechanism for distinguishing between a door panel echo and an item in the compartment. If an echo is returned from some minimum distance within which the top of the door panel lies, the controller interprets the echo as being from a passing door panel and does not undertake security procedures. In FIG. 5, the minimum distance is represented by bit number "m" in each array and results array R, which is shown as the second bit. (In general, the number will depend on the distance from the sensor to the top of the door panel, and the incremental distance that each bit in an array column represents.) So, when bits 1 and 2 are "0", no door wing is passing by. However, if bit 1 and/or 2 is "1", a door wing is assumed to be passing by.

When a door wing has been detected, the system, i.e., controller 294, blanks out all responses, e.g., ignores any further sensor feedback from the sensor(s) for which the wing has been detected. So, if a "1" is in bit 1 or 2 for sensors 99c and 99d (e.g., sensors 3 and 4 in FIG. 5) in array 101, the controller 294 clears all bits in array 101 for sensors 99c and 99d. The same will be true if the controller detects a "1" in bit 1 or 2 in the next array 102. This clearing process has the effect of creating all "0s" in the results array R for the columns corresponding to the sensors (99c and 99d) where a door frame has been detected, due to the ANDing process. If clearing takes place after ANDing, the results array is either cleared in the corresponding column or ignored for that corresponding column.

The clearing process is important to avoid erroneous detection of an object. When a door frame passes under a sensor, there often are numerous reflections of an ultrasonic burst between the sensor face and the top of the door frame. Such reflections would cause "1s" to be stored in the column corresponding to the sensor for several time periods in the memory array, which might correspond to three or four feet downward into the chamber. Accordingly, it is possible that these, or some of these, false "1s" will AND with other false "1s" and cause the results array to falsely indicate detection of an object. Although the count in the door position detection system 197 could be used to determine when door frames are passing particular sensors and the results array can be ignored for those sensors, the "1s" recorded in the array 101, 102, . . ., or 10n, might AND with future false "1s" to create a false object detection.

Clearing only the column corresponding to the sensor detecting a door frame enables random placement of the sensors. Use of array clearing also eliminates any dependence on tolerances in door position detection. Moreover, as the door frame passes the radially outer sensors in fewer burst cycles (and thus fewer degrees of rotation) than the radially inner sensors, the controller recovers faster from door frame passage at the outer sensors. Thus, sensing ability can be recouped relatively quickly, and without the tolerance problems incurred by relying on door position detection.

Controller 294 evaluates the contents of the results array R and passes the echo or no echo information to main processor 194 for decision making regarding empty and non-empty compartments. That is, controller 294 preferably sends at least eight signals (i.e., eight input lines) to processor 194.

The first four signals indicate object detection (other than a door frame) at sensors 99a or 99b, 99c or 99d, 99e or 99f, and 99g or 99h, respectively. Alternatively, a signal could be sent for each sensor. The fifth and sixth signals indicate object detection by trapped man sensors 99i, 99j, respectively. The seventh and eighth lines issue antipiggybacking signals for the entrance and exit, as discussed later. Additional inputs to indicate alarm output, tampering with the sensor(s), failed sensor(s), or the like, may be added.

Where the control system is equipped with antipassback (prevention of card passback) features, such as disclosed in U.S. Pat. No. 4,627,193, object detection can be used to improve the reliability of the system. If an object has not been detected in the authorized chamber by a predetermined amount of rotation of the door wings, such as 90° from their starting position, the processor could stop and reverse the drive system until the door wings are returned to their starting position. For example, with renewed reference to FIG. 2, if the starting position is with wings 52 lying along lines A and B, and if the ID device 110 indicates authorized entry at area 26, at least one of sensors 99a, 99b must indicate an object by the time the door wings have moved 90°. Actually, when security measures are required, the main processor preferably should begin stopping the door at some point less than 90°, so that a smooth stop can be made before the compartment communicates at all with the exit 46.

This antipassback feature can also require at least one of sensors 99c, 99d to indicate an object at some time between when the door wings have moved 90° to when they have moved 180°. Thus, even though antipassback normally prevents the same ID device from recognizing the same card twice, if the authorized user neglects to enter the door, the ID device where the user inserted the card will still recognize that card.

In accordance with another aspect of the invention, the system detects piggybacking. To do this, the system determines a threshold height, which is a predetermined percentage of a maximum height detected, and determines the total time that height readings exceed this threshold. If the total time reaches or exceeds a predetermined time, the system interprets this as piggybacking. The system also detects two individuals when height readings exceed the predetermined threshold height, drop below it, and then exceed it again. This latter test looks for "two peaks and a valley."

The anti-piggybacking system will be explained in more detail with reference to FIG. 5A, which shows additional details of memory 394. There is an additional array which keeps track of the maximum height $H_{MAX}$ detected by each sensor for each burst. (This number is preferably stored in a binary form, but is shown in base 10 in FIG. 5A for simplicity.) As bursts occur at, or substantially at, increments of 3° of rotation of the door, the height is indexed by the door angular rotation from its starting position of line A in FIG. 2. Thus, for example, in FIG. 2, the door angle is about 45°. Since the door preferably rotates at a constant speed, the door angle corresponds to elapsed time from the time that door rotation begins.

The maximum height is determined for each sensor by starting with the earliest detected echo by that sensor following each burst. This number can be taken from the array 101, 102, or 10n which is currently being filled, or even from the results array R. For the readings shown in array 101 for sensor 2 in FIG. 5, the earliest detected echo is at bit number 44. Where each bit represents 1.5" and the total chamber height is 8' (96"), the current maximum height is 96" minus 1.5"×44 which equals 30". The maximum height is updated for each burst. Therefore, in the example shown in FIG. 5A, sensor 2 (e.g., sensor 99b) first detects an object at 9° of rotation. Sensor 1 (e.g., sensor 99a) has not yet detected an object. The security controller calculates the height as 30" (e.g., a briefcase at bit 44) and stores this in the memory array indexed at 9°. The maximum height is then multiplied by a predetermined percentage x, which is sufficiently small to detect people bending or kneeling, yet not too small as to cause almost anything to be interpreted as piggybacking. Such a percentage could be on the order of 25%, or even up to about 90%, depending on the device's tolerances and the amount of security required and whether or not briefcases and the like are to be detected. Thus, the threshold $H_{TH}$ for sensor 2 at 9° is 30x, which is obviously exceeded by 30" where x is less than 100%. The memory also keeps track of the total time $t_{AT}$ above the threshold. This is now 3°, or one occurrence.

At 12°, both sensors 1 and 2 detect the object at 30" above the floor, so the threshold for both sensors is 30x. Again, 30' is above 30x, so now the time above the threshold for sensor 1 is 3° and for sensor 2 is 6°. At 15°, sensor 1 still detects only the top of the object, while sensor 2 now is detecting an individual's head or hat at 72" from the floor. From 18° and on, the maximum height detected is never more than 72", so the threshold remains at 72x for both sensors 1 and 2.

As noted above, the security controller compares the time above the threshold to a predetermined time $T_{AT}$, and if the predetermined time is met or exceeded, the system interprets this as two individuals. In addition, even if the predetermined time is not met, the system will interpret dropping below the threshold, then rising above it again, as two individuals. This situation is shown in FIG. 5A, where, at door angle 39°, sensor 2 drops to zero, then returns to 69" at 45°. Sensor 1 also detects two individuals, as it drops to zero at 45°, then returns to 69" at 48°. Therefore, even if 66° of door rotation is insufficient to meet the time test for sensor 1, and 54° is insufficient to meet the time test for sensor 2, the "two peaks and a valley" test will be met.

The total time test need not necessarily be the same for sensors 1 and 2, because the total time an object is under sensor 1 will tend to be greater than sensor 2 due to the placement of sensor 1 closer to the door's axis. In addition, the memory arrays in FIG. 5A could be replaced with one memory space or register for each of "maximum height," "threshold," and "time above threshold," which are updated after each burst, and also a space to keep track of when there has been a first peak, a valley, and a second peak.

The total time that the detected height should be at or above the threshold to indicate piggybacking is preferably in a broad range between 15° to 80° (5–16 occurrences), and preferably the inner sensor, i.e., sensor 1 is set at a longer time than the outer sensor, i.e., sensor 2, e.g., by 6° to 12°. The broad time range depends upon a trade-off between security and incorrect detection of piggybacking in that the shorter the time, the greater the security, but the more likely that a single user such as one with a package, or unusually heavy, or wearing a large hat, will be detected as piggybacking.

With reference to FIG. 6, which is a flowchart of the main operations of the processor and security controller, an authorized user first inserts a card into one of the key card readers 110, 114 to begin operation of the door. The device 110 or 114 determines whether the user is authorized (step 6-1), and if so, the processor 194 starts the drive system (step 6-2). A variable i is set to 1 (to represent array 101) (step 6-3), and the processor determines whether the user has passed from the entry point to exit point (step 6-4). If so, the drive system is deactivated (step 6-5) by the processor 194 and trapped man sensors 99i and 99j (described below) are activated (step 6-18) by the security controller 294. If passage is not complete, the controller sends signals $A_1$ through $A_8$ to sensors 99a-99h, and the sensors emit ultrasonic energy waves (step 6-6).

In steps 6-7 and 6-8, the echoes (signals $B_1$ through $B_8$) are received for each sensor and stored in array "i". The ANDing process also takes place to fill or update the results array (step 6-8). When the results array R is filled/updated, the security controller evaluates the results array to find any echoes and their distances (step 6-9). This step may involve performing fail-safe functions, as discussed in U.S. Pat. No. 4,682,153 (Boozer et al), checking the echoes to determine if a floor echo is present, and the like.

Now that the results array is filled and evaluated, in step 6-10 the security controller 294 determines the maximum height ($H_{MAX}$), threshold height ($H_{TH}$), and time at or above $H_{TH}$ ($t_{AT}$). At step 6-1, the controller compares the actual time $t_{AT}$ with the predetermined time limit $T_{AT}$. If $t_{AT}$ does not exceed $T_{AT}$, the controller also determines if two peaks with a valley in between have been detected (step 6-12), and if not, the controller then determines whether or not a door wing has been detected (by examining the first m bit(s) in each column of array "i") (step 6-13). If a door wing is detected, the clearing operation is performed (step 6-14). The controller 294 will clear the columns in array "i" which correspond to any sensors detecting a door wing. If, as shown in FIG. 6, ANDing has already taken place, the controller may also ignore, e.g., inhibit, output for the corresponding columns in the results array. Alternatively, ANDing could be delayed until after the clearing operation.

The controller 294 may also detect sensor failure or blockage (step 6-15), and implement security measures in that case (step 6-20). Such security measures will also be invoked if $t_{AT} \geq T_{AT}$, or if a second peak is detected after a first peak and a valley, since the controller will issue a signal (indicating piggybacking) to the controller. Security measures may include any or all of the following which are appropriate (as in other situations where security measures are appropriate): stopping further progress of the door, stopping and reversely rotating the door, and initiating an alarm. If no door wing is detected, or after clearing (with no failure detection), the processor 194 examines the inputs from the security controller 294. Whether or not a chamber is authorized or unauthorized is determined by the processor 194, using outputs from identification device 110 or 114, such as in U.S. Pat. No. 4,627,193, or other suitable means. That is, authorized entry at area 24 will be relayed by the identification device 114 to the processor 194, which will then recognize signals on the first or second line from sensor 99a or 99b, or 99c or 99d as authorized, and signals on the third or fourth line from sensor 99e or 99f, or 99g, or 99h as unauthorized. (The opposite is true for authorized entry indicated by device 110.) Accordingly, the processor knows which chambers are authorized and which are unauthorized for use, for steps 6-16 and 6-17. If there are echoes in unauthorized chambers, security measures are taken. When security measures are taken, the memory is preferably cleared. The memory is also preferably cleared where security measures have not been taken by 90° of turn.

In the case where object detection is used to supplement an antipassback feature, the processor performs step 6-17. That is, the processor checks for echoes in authorized chambers by using the information on the first line or two lines to it from the controller indicating detection or no detection at sensors 99a, 99b and 99c, 99d, the inputs of devices 110 and 114, and the input of the position detection system 197 to determine if echoes have been received in the authorized chambers by the predetermined amount of time or amount of door rotation. In this way, the position detection system, which keeps track of the authorized chamber, serves to keep track of the authorized user. If no echoes are received, then security measures are implemented (step 6-20).

If there are no echoes in unauthorized areas, and there are echoes in the authorized areas (or there is no antipassback feature), then the controller 294 next determines which storage array will be updated in response to echoes from the next burst to be generated. This is done by determining whether the storage array "i" that has just been filled is the last one (i=n) (step 6-21). If array "i" is the last one, "i" is set to one (step 6-3) so that the first array 101 has its contents replaced by the echoes in response to the next burst. If the storage array that has just been filled is not the last array 10n, then "i" is incremented by 1 (step 6-22), so that the next array has its contents replaced. Thus, the contents of each array are successively updated, and the contents of the results array are updated each time a storage array has been updated.

Sensor failure or blockage may be detected in several ways. If sensors are all positioned such that all (or some) door wings will align with the sensors at the same time, the processor or controller can simply check the results array at the first and second bits for each sensor (or the ones which will align) to determine if there is a "1" in at least one of the first and second bits for each sensor. If all the sensors do not show a "1" in at least one of the first two bits, tampering, malfunction, or other problem could be assumed. Another method is measuring the amount of time that the first two bits contain at least one "1", and assuming there is a sensor malfunction, jammed door, or tampering if the predetermined time for the door to pass the sensor has been exceeded. In such a case, an alarm is triggered, or building security is notified.

The range "d" to which the echo receive time is set is based on a compromise between optimum coverage and avoiding noise caused by echoes from the floor, which can occur due primarily to changes in the velocity of sound with temperature. That is, as temperature increases, the velocity of sound increases causing the floor to appear to move upward. The shift in apparent floor position is about 0.1% per degree Fahrenheit. For a 10' floor-to-ceiling distance, there is a shift of about 1' per 100° F.

In accordance with a further feature of the invention, the range is controllable. As shown in FIG. 3, five DIP switches 81 through 85 set the range, each switch representing an incremental increase in the range. For example, switch 81 is 48", switch 82 is 24", switch 83 is 12", switch 84 is 6", and switch 85 is 3", so that turning on all the switches results in a 93" range. If range is 7, (84"), as discussed above. A reasonable minimum range is two-thirds of the door height (i.e., 64"). These DIP switches are shown connected to the controller 294, but could alternatively be inputted to the processor 194.

In response to the setting on the DIP switches, the controller determines how many bits in each column of the arrays to fill (or to pay attention to). For example, an 84" setting corresponds to 56 bits, and a 72" setting is 48 bits. The optimal maximum distance setting (set by the DIP switches) can be lengthened if real time temperature compensation is used. Such compensation is performed by measuring the floor echo return time (i.e., the apparent distance of the floor) and correcting for any changes from the expected time/distance. This processing can be performed in any "dead time," e.g., during the time between bursts (after the last bit in the array has been filled but before the next burst). Other processing, such as running software timers and finding any failed sensors, can be performed in the "dead time" too.

Additional DIP switches may be provided to provide an adjustable percentage x of the maximum height for the threshold height, an adjustable time limitation $T_{AT}$, an adjustable length of time that a valley is detected between two peaks, and other factors.

As shown in step 6-18, trapped man sensors 99i and 99j operate following and at times other than authorized passage, in case an item or person is trapped in a compartment at other than the entrance or exit. These sensors are the same as the sensors 99a through 99h, and are controlled in the same way as sensors 99a through 99h. A single memory array or multiple memory arrays may be used for these sensors 99i,99j, and the ANDing process may also be used. When echoes from a trapped item or person are detected (step 6-19), security measures (step 6-20) are taken.

The disclosed embodiment is only an illustration of the invention, and is not intended to limit the scope of the invention. The invention is defined in the appended claims. For example, instead of a separate processor and controller, the control system can include just one microprocessor/controller to perform all of these functions, such as represented by the dashed line box 494 in FIG. 3.

What is claimed is:

1. A control system for a security door having a housing with a first portal, a second portal, and movable door member, forming at least one compartment, for normally blocking passage between the first and second portals, the control system comprising:
    means for identifying an authorized user;
    means for moving the door member to move a compartment containing the authorized user from the first portal to the second portal;
    means for tracking movement of the door member and the compartment containing the authorized user from the first portal to the second portal;
    sensing means disposed in the housing for emitting energy waves into the housing between the first and second portals, and for detecting echoing of the energy waves due to any objects or users in the housing; and
    a controller connected to the means for moving, the means for identifying, the sensing means, and the means for tracking for driving the means for moving in response to identification of an authorized user, said controller including means for detecting successive heights in response to echoes detected b the sensing means and means for determining that there is a second user in the compartment containing the authorized user on the basis of the successive detected heights.

2. The system of claim 1, wherein the means for detecting and determining comprises means for comparing the successive detected heights to a predetermined percentage of a maximum detected height, and for indicating that a second user has been detected when a minimum number of the detected heights exceed the predetermined percentage of the maximum height.

3. The system of claim 1, wherein the means for detecting and determining comprises means for comparing the successive detected heights to a predetermined percentage of a maximum detected height, and for indicating that a second user has been detected when the detected heights form a pattern where they exceed the predetermined percentage of the maximum height, then fall below the predetermined percentage of the maximum height, then once again rise above the predetermined percentage of the maximum height.

4. The system of claim 2, wherein the controller further comprises means for determining a height of an object or user detected by the sensor means for successive positions of the door means, means for comparing further compares successive detected heights to a predetermined percentage of a maximum detected height, and indicates that a second user has been detected when the detected heights form a pattern where they exceed the predetermined percentage of the maximum height, then fall below the predetermined percentage of the maximum height, then once again rise above the predetermined percentage of the maximum height.

5. The system of claim 1, wherein the security door is a revolving door and the movable door member forms a plurality of movable compartments.

6. The system of claim 1, wherein the controller performs security measures in response to a determination that there is a second user in the compartment containing the authorized user, the security measures comprising at least one of stopping the door member and reversing the door means until the compartment containing the authorized user returns to the first portal.

7. The system of claim 1, wherein the controller determines that there is a second user when the echoes detected by the sensing means form a predetermined pattern.

8. A method for controlling a security door having a housing with a first portal, a second portal, and a movable door member, forming at least one compartment, for normally blocking passage between the first and second portals, the method comprising the steps of:
identifying an authorized user;
moving the movable door member to move a compartment containing the authorized user from the first portal to the second portal in response to identification of an authorized user;
tracking the amount of movement of the movable door member containing the authorized user from the first portal to the second portal;
emitting bursts of energy waves from a sensor into the housing between the first and second portals, and detecting echoes of the energy waves with the sensor due to any objects or users in the housing; and
successively determining a height of an object or user in the authorized compartment in response to echoes detected by the sensing means and the amount of movement of the movable door member and determining that there is a second user in the compartment containing the authorized user on the basis of the successively detected heights.

9. The method of claim 8, wherein the step of determining further comprises a step of comparing the successive detected heights to a predetermined percentage of a maximum detected height, and determining that there is a second user in the compartment containing the authorized user when a minimum number of successive detected heights exceeds the predetermined percentage of the maximum height.

10. The method of claim 8, wherein the step of determining comprises a step of comparing the successive detected heights to a predetermined percentage of a maximum detected height, and indicating that a second user has been detected when the detected heights form a pattern where they exceed the predetermined percentage of the maximum height, then fall below the predetermined percentage of the maximum height, then once again rise above the predetermined percentage of the maximum height.

11. The method of claim 9, wherein the step of determining further comprises a step of comparing the successive detected heights to a predetermined percentage of a maximum detected height, and indicating that a second user has been detected when the detected heights form a pattern where they exceed the predetermined percentage of the maximum height, then fall below the predetermined percentage of the maximum height, then once again rise above the predetermined percentage of the maximum height.

12. The method of claim 8, wherein the security door is a revolving door and the movable door member forms a plurality of compartments, and the step of moving comprises revolving the door member to move the plurality of compartments.

13. The method of claim 8, wherein the step of determining comprises determining that there is a second user when the echoes detected by the sensing means form a predetermined pattern.

14. The method of claim 8, further comprising a step of performing security measures in response to determining that there is a second user, the security measures comprising at least one of stopping the door member and reversing the door member until the compartment containing the authorized user and second user returns to the first portal.

* * * * *

UNITED STATES PATENT AND TRADEMARK OFFICE
CERTIFICATE OF CORRECTION

PATENT NO. : 5,201,906

DATED : April 13, 1993

INVENTOR(S) : Milan Schwarz; Robert Mayer

It is certified that error appears in the above-identified patent and that said Letters Patent is hereby corrected as shown below:

On title page, item

[56] References Cited, U.S. PATENT DOCUMENTS, change
"4,475,308   10/1984   Heise et al...49/42" to
-- 4,475,308   10/1984   Heise et al...49/52 --.

[56] References Cited, U.S. PATENT DOCUMENTS, change
"4,530,183   7/1985   Heise et al...49/42" to
-- 4,530,183   7/1985   Heise et al...49/52 --.

Column 2, line 16, before "ultrasonic" change "and" to
-- an --.

Column 8, line 3, change "affect" to -- effect --.

Column 10, line 15, change "101, 102, or 10n" to
-- 101, 102, ... or 10n --.

Column 12, line 63, change "problem" to -- problems --.

Column 13, line 19, after "If" insert -- the ceiling height
is 8'(96"), the recommended maximum --.

Column 13, line 19, change "7," to -- 7' --.

UNITED STATES PATENT AND TRADEMARK OFFICE
CERTIFICATE OF CORRECTION

PATENT NO. : 5,201,906
DATED : April 13, 1993
INVENTOR(S) : Milan Schwarz; Robert Mayer It is certified that error appears in the above-identified patent and that said Letters Patent is hereby corrected as shown below:

In the Claims

Column 14, line 20, after "detected" change "b" to -- by --.
Column 14, lines 43,44, after "wherein the" delete "controller further comprises".
Column 14, line 45, change "means, means" to -- means, and means --.

Signed and Sealed this

Twelfth Day of April, 1994

Attest:

BRUCE LEHMAN

Attesting Officer

Commissioner of Patents and Trademarks